Jan. 12, 1932.  M. D. CHESNUT  1,840,933
LIQUID DISPENSING DEVICE
Filed Feb. 7, 1930
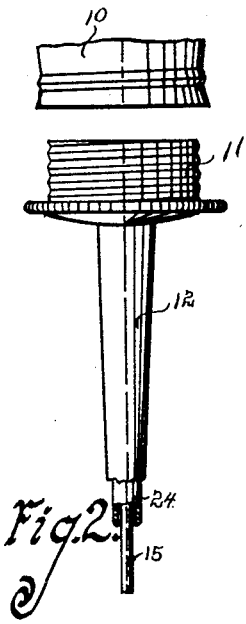
Fig. 2.
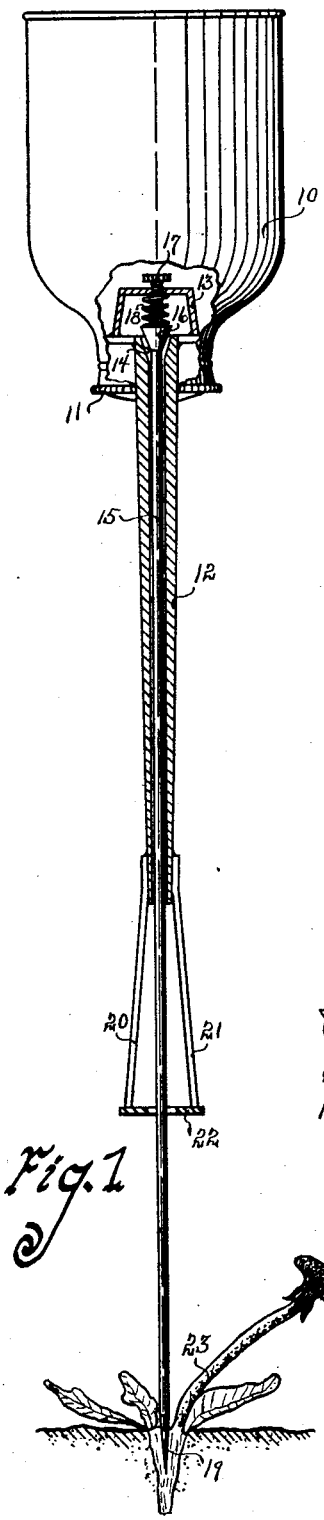
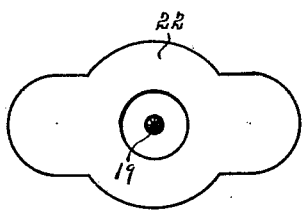
Fig. 4.
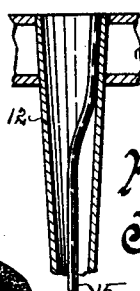
Fig. 1.
Fig. 3.
Inventor
Mollie D. Chesnut
By M. Talbert Dick
Attorney Patented Jan. 12, 1932

1,840,933

UNITED STATES PATENT OFFICE

MOLLIE D. CHESNUT, OF DES MOINES, IOWA

LIQUID DISPENSING DEVICE

Application filed February 7, 1930. Serial No. 426,539.

The principal object of this invention is to provide a liquid dispensing device that is capable of applying destructive liquids to or into undesirable plant life.

A further object of my invention is to provide a liquid dispensing device for dispensing destructive liquids for killing undesirable plant life such as weeds and the like that does not affect other vegetation growing adjacent to the plant being killed.

A still further object of my invention is to provide a device for dispensing liquid to or into undesirable plants that automatically assumes a closed condition regardless of its position when not actually engaging the undesirable plant life to be treated.

A still further object of my invention is to provide a device for dispensing harmful liquids to undesirable vegetation that is free from clogging or fouling tendencies by coming in contact with foreign matter when treating such undesirable vegetation.

A still further object of my invention is to provide a liquid dispensing device for applying harmful liquids to undesirable plant life that is easy to operate.

A still further object of my invention is to provide a liquid dispensing device for killing undesirable plant life that eliminates the stooping or bending over of the operator while operating the invention.

A still further object of this invention is to provide a liquid dispensing device that is economical in manufacture and durable and economical in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a side view of my invention in use with sections cut away to more fully illustrate its interior construction.

Fig. 2 is a side sectional view of a portion of the invention illustrating the manner in which the stem portion of the invention may be detachably unscrewed from the reservoir portion for filling purposes.

Fig. 3 is a side sectional view of a portion of the stem portion when the self-closing valve feature is not used.

Fig. 4 is a bottom view of the guard embracing the pointed applying needle.

In the caring of beautiful lawns one is always troubled with undesirable weeds such as dandelions and the like. The problem is to eradicate such plant life without harm to the surrounding grass or other vegetation. I have made this possible as will be appreciated by those familiar with the art.

I have used the numeral 10 to designate the reservoir portion of the invention having a filling cap 11 capable of being threaded into the same and enclosing the same. Extending from the filling cap 11 and communicating with the inside of the reservoir 10 when the filling cap is threaded onto the reservoir is the hollow stem 12.

So far the above described portion of the invention comprises little more than the common and well known oil can used for oiling machinery and the like and having the usual manually depressible bottom for causing liquid inside the can to pass out through the stem of the can.

Secured by suitable means to the cap 11 and inside the reservoir 10 when the cap is threaded thereon is the bridge bracket member 13 extending above and across the bore of the stem 12 as shown in Fig. 1. The numeral 14 designates a valve seat in the inlet end of the stem 12 and communicating with the bore of the same. Slidably mounted in the bore of the stem 12 and having a diameter less than the inside diameter of the stem 12 is the rod 15. Formed on the rear end of this rod 15 is a cone shaped member 16 capable of engaging the valve seat 14 and enclosing the bore of the stem 12. Threaded through the bracket member 13 and capable of engaging the rear end of the cone 16 is the hand screw 17. By this construction the sliding movement of the rod 15 in the bore of the stem 12 will be limited in movement to one direction by making contact with the end of the screw 17 and limited movement in the other direction by the cone member 16 making contact with the valve seat 14. By adjusting the screw 17, the reciprocation of the rod 15 will be adjustably confined between the two limits of its sliding movement. In other words the adjusting of the screw 17 will regulate the distance the cone or valve 16 may move out of engagement with the valve seat 14 and this movement will be relative to the amount of liquid passing out of the reservoir 10, through the stem 12 in a given length of time. To permit then a greater amount of liquid to pass through the stem 12 from the reservoir 10 the screw 17 should be rotated to the left thereby moving its lower end farther away from the inlet end of the stem 12.

The numeral 18 designates a coil spring embracing the screw 17, having one end engaging the bracket member 13 and its other end engaging the end of the cone member 16 as shown in Fig. 1. This coil spring 18 yieldingly holds the cone member 16 in contact with the valve seat 14 thereby closing the bore of the stem 12 and preventing any liquid to pass through the stem 12 from the reservoir 10. It will be noted that the forward end of the rod 15 extends a considerable distance beyond the forward end of the stem 12. This length of the rod 15 from its pointed end 19 to the forward end of the stem 12 may be of any desired distance and will depend a great deal upon the particular work required of the invention. The numerals 20 and 21 designate two arms secured by suitable means to the forward end portion of the stem 12 and extending forwardly and outwardly as shown in Fig. 1. The numeral 22 designates a guard plate secured to the free ends of the arms 20 and 21 and embracing the rod 15 some distance from the forward end of stem 12 as shown in Fig. 1. The operation of the invention is very simple. Fill the reservoir 10 with any suitable plant killing solution or liquid such as gasoline or the like. Place the point 19 on the plant to be killed and push downwardly on the reservoir 10 which will cause the point of the rod 15 to pierce the plant to be killed as shown in Fig. 1, and the spring 18 will be compressed and the cone valve 16 moved out of closed engagement with the valve seat 14 permitting the killing liquid to pass through the bore of the stem 12 and by capillary action follow the rod 15 to the plant to be killed. If the bottom of the reservoir 10 is of the compressible type by manually depressing the same in the well known manner the liquid in the reservoir 10 will be accelerated in its travel to the plant, which in the drawings I have designated by the numeral 23.

By the free end of the rod 15 being pointed, an opening will be created to the heart of the plant into which the killing fluid or liquid may enter. The guard plate 22 aids in protecting the open forward end of the stem 12 from becoming fouled or clogged by foreign matter such as dirt or the like, which may be experienced when operating the invention.

As soon as downward pressure ceases to be exerted on the reservoir 10 and the rod 15 is out of engagement with the plant to be killed the coil spring 18 will return the cone 16 to the valve seat 14 thereby closing the bore in the stem and preventing any further amount of liquid to pass from the reservoir 10. This is advantageous when the liquid is highly volatile such as gasoline, and the closing and sealing of the bore in the stem prevents the liquids in the reservoir 10 from evaporating.

In Fig. 2, and Fig. 3, I show the rod 15 permanently and rigidly secured against sliding movement inside the bore of the stem 12. This construction is desirable when the use of a valve in the bore of the stem is not desired.

Although I have described my invention for the killing of undesirable plant life, it may be used to equal advantage for many other and varied purposes such as the oiling of inaccessible parts of machinery. If it is desired the rod 15 may be flexed or bent at various desirable angles and the liquid passing through the stem 12 will follow the rod 15 to the desired point location of application.

When the construction shown in Fig. 3 is used the amount of oil passing through the stem 12 may be regulated by restricting the inside diameter of its bore to the outside diameter of the rod 15. This may be accomplished by crimping the forward end of the stem 12 closer around the rod 15 or the use of an auxiliary hollow pipe 24 inserted in the stem 12 and around the rod 15 as shown in Fig. 2.

Some changes may be made in the construction and arrangement of my improved combination liquid dispensing device without departing from the real spirit and purpose of my invention, and it is my intention to cover by my claims any modified forms of structure or use of mechanical equivalents which may be reasonably included within their scope.

I claim:

1. In a device of the class described, a reservoir, a hollow stem secured to said reservoir and having one end communicating with the inside of the same, a valve-seat formed in the end of the said stem that communicates with the inside of said reservoir, a rod slidably mounted in said stem and extending a substantial distance beyond the forward end of said stem, a valve-head formed on the rear end of said rod capable of engaging said valve-seat, a bracket operatively connected to said stem and inside said reservoir, a screw threaded into said bracket capable of engaging said valve-head when said rod is moved to the rear, and a coil spring embracing said screw, having one end engaging said bracket and its other end engaging said valve-head.

2. In a device of the class described, a reservoir, a hollow elongated stem secured to said reservoir and communicating with the inside of the same, a rod extending through said hollow elongated stem and terminating at a point a considerable distance beyond said stem, two elongated arms secured to the forward end portion of said stem and extending along the sides of said rod toward its forward end, and a plate having a hole in its center loosely embracing said rod at a point a considerable distance beyond the forward end of said stem and secured to said arms.

MOLLIE D. CHESNUT.